United States Patent [19]

Vegella

[11] 4,060,023
[45] Nov. 29, 1977

[54] DUAL LIP ROD WIPING SEAL

[76] Inventor: George Vegella, 13428 E. Nine Mile, Warren, Mich. 48089

[21] Appl. No.: 693,055

[22] Filed: June 4, 1976

[51] Int. Cl.² .............................................. F16J 15/18
[52] U.S. Cl. ...................... 92/168; 277/186; 277/205
[58] Field of Search .............. 92/168; 277/205, 183, 277/186, 189

[56] References Cited

U.S. PATENT DOCUMENTS

| | | | |
|---|---|---|---|
| 2,913,269 | 11/1959 | Bremer et al. | 277/205 |
| 3,007,723 | 11/1961 | Clarke | 92/168 |
| 3,310,230 | 3/1967 | Wirth | 92/168 |
| 3,841,204 | 10/1974 | Bennett et al. | 92/168 |
| 3,955,479 | 5/1976 | McLuckie | 92/168 |

*Primary Examiner*—Paul E. Maslousky
*Attorney, Agent, or Firm*—Reising, Ethington, Barnard, Perry & Brooks

[57] ABSTRACT

A one-piece piston rod wiping seal member for cleaning reciprocating piston rods or plungers as the rod moves into the cylinder chamber for cleaning dust and other foreign matter from the surface of the rod to prevent the foreign matter from entering the working chamber and contaminating the interior thereof. The wiping seal member is of one-piece construction and includes an endless body portion of elastomeric material with a pair of lips projecting axially and radially with respect to an end wall of the body member. One of the lips is a rod engaging lip and projects radially inwardly to engage the surface of a piston rod. The other lip is a cylinder end cap engaging the lip for engaging the end cap of the cylinder. The body portion can be snap fitted into a groove in the end cap of the cylinder. When installed, clearances are provided between the surfaces of the mounting groove of the end cap and the surface of the body portion of the seal member to prevent over stressing of the wiping lips upon lateral movement of the piston rod.

4 Claims, 2 Drawing Figures

DUAL LIP ROD WIPING SEAL

BACKGROUND OF THE INVENTION

1. Field of the Invention

This invention relates generally to seal members, and is particularly concerned with piston rod wiping or scraping seal members for cleaning dust and other foreign matter from reciprocating piston rods as the rod enters a cylinder chamber to prevent contamination of the chamber.

2. Description of the Prior Art

A particular problem that occurs with piston and cylinder assemblies is that of preventing contamination of the chamber formed between the piston head and the end wall of the cylinder. As the piston reciprocates within the chamber, the piston rod moves in and out of the chamber. Dust and other foreign matter can collect on the surface of any portion of the piston rod externally of the chamber. When the rod moves back into the chamber on a return stroke, the dust and other foreign matter must be cleaned from the surface of the rod. If it isn't, the foreign matter may not only enter the working chamber within the cylinder, but can damage the seal or packing assembly surrounding the piston rod in the end wall of the cylinder.

It is conventional to mount in a groove in the end wall of the cylinder a scraping or wiping seal member of resilient material (sometimes also referred to as excluders) for wiping or scraping dust and other foreign matter from the surface of a piston rod on an inward stroke of the piston.

Among the problems associated with such rod wiping seals is providing a construction that can be easily installed and removed, and one that will stand up under adverse operating conditions without an unacceptable failure rate.

Another problem with prior art rod wiping seals is that premature failure of the seal frequently results from the accummulation of dirt and other foreign matter between the walls of the packing housing and the wiping seal. The accummulated dirt forces the wiper toward the rod which results in excessive friction between the rod and wiping seal. Furthermore, when the bearings used to maintain alignment of the rod wear, transverse movement of the rod results. This increases the likelihood of dirt and foreign matter entering the cylinder between the surfaces of the packing housing and the wiping seal because of the transverse forces tending to cause distortion of the wiping seal when the rod moves transversely.

SUMMARY OF THE INVENTION

An object of this invention is to provide a one-piece rod wiping seal of resilient or elastomeric material that can be snap fitted into a mounting groove of a cylinder end wall, and that can withstand adverse operating conditions such as transverse movement of the reciprocating rod with which it is engaged.

A further object is to provide a rod wiping seal that, when installed, can maintain substantially uniform wiping pressure on the rod regardless of transverse movement of the rod with respect to the seal to prevent the occurrence of excessive friction between the seal and rod.

Another object is to provide a rod wiping seal that, when installed, can maintain substantially uniform sealing pressure on the wall of the packing housing regardless of transverse movement of the rod to reduce the likelihood of the entry of dirt and other foreign matter into the cylinder between the seal and packing housing.

In carrying out the foregoing, and other objects, a seal member according to the present invention includes an endless body portion having a pair of spaced end walls and inner and outer side walls extending therebetween. The side walls are concentric with the central axis of the body. Projecting from one end wall is a pair of sealing lips each having an inner end joined integrally to the end wall and projecting therefrom to an outer free end. One of the lips constitutes a rod engaging lip and has an inner side surface that projects axially and radially inwardly for engaging the surface of a piston rod. The other lip constitutes a cylinder engaging lip and has an outer side surface that extends axially and radially outwardly from the end wall. The outer side wall of the body portion, the portion of the end wall from which the lips extend between the outer side wall and the cylinder engaging lip, as well as the other end wall of the body portion serve as mounting groove engaging surfaces to be received in the mounting groove of an end cap for the cylinder.

When installed, clearances are provided between the outer side wall of the body portion and the corresponding wall of the groove, as well as between the inner side wall of the body portion and the surface of the piston rod so that lateral movement of the piston rod will not over stress the sealing lips, without at the same time interfering with the sealing and scraping function of the two lips.

Other objects, advantages and features of the invention will become apparent from the following description taken in connection with the accompanying drawings.

DESCRIPTION OF THE PREFERRED EMBODIMENT

Figure 1:
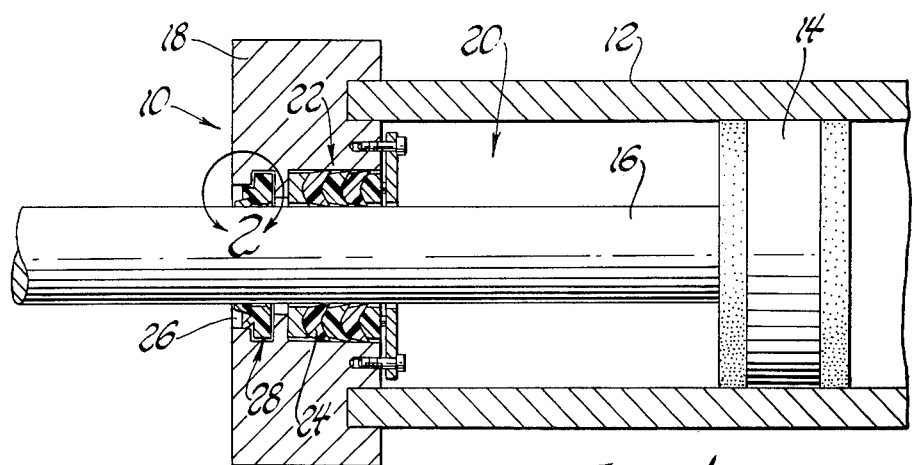
FIG. 1 is a cross sectional view of a piston and cylinder assembly having a rod wiping seal member embodying the present invention.

In FIG. 1, reference numeral 10 collectively designates a piston and cylinder assembly. The assembly 10 includes a cylinder 12 having a piston 14 reciprocably mounted therein. The piston 14 has a body 16 extending through an end wall or cap 18 of the cylinder. Reference numeral 20 indicates a working chamber in the cylinder defined between the reciprocating piston 14 and the end wall 18.

Reference numeral 22 collectively designates a conventional packing assembly including a plurality of V-type seals 24. The seals 24 are nested together between end plates in a conventional manner. The specific construction of the packing assembly 22 forms no part of the present invention.

Figure 2:
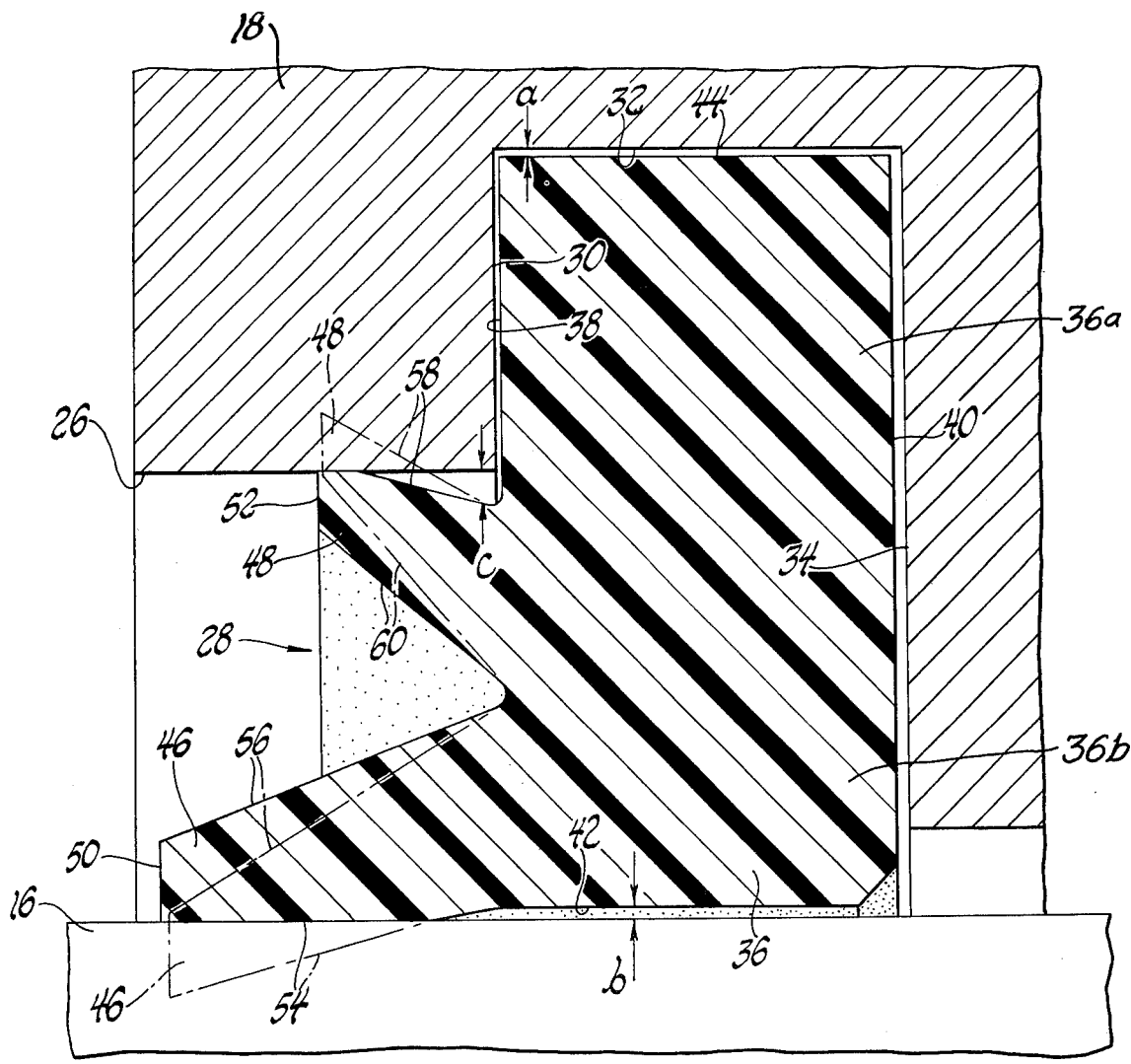
FIG. 2 is an enlarged sectional detailed view of the portion of FIG. 1 enclosed by circle 2.

The end wall member 18 is formed with an opening 26 for receiving the reciprocating piston rod 16. Reference numeral 28 collectively designates a piston rod wiping seal which is mounted in a groove formed in the wall of the opening 26 of the end wall member 18. The groove receiving the wiping seal member 28 has a top wall 30, an annular side wall 32, and a bottom wall 34 as illustrated in FIG. 2.

The seal member 28 is of one-piece construction of elastomeric material. The seal member 28 includes a main body portion 36, which, as shown is of generally rectangular construction in cross section. The body portion has a mounting section 36a for mounting seal member 28 in the groove in the wall of opening 26 by flexibly distorting the body portion and snap-fitting the mounting section 36a in the groove. The body portion also includes a sealing section 36b extending radially from the mounting section 36a. The main body portion 36 includes a top end wall 38, a bottom end wall 40, and inner and outer annular side walls 42 and 44, respectively, extending between the end walls 38 and 40. The end walls 38 and 40 extend over both of the mounting and sealing sections. The inner side wall 42 is located on the sealing section 36b and the outer side wall 44 is located on the mounting section 36a. First and second sealing lips 46 and 48 project from the end wall 38 at the sealing section 36b. The first sealing lip 46 constitutes a rod engaging lip for engaging the surface of the piston rod 16. The second sealing lip 48 constitutes a cylinder engaging lip for engaging the wall of the opening 26. The unstressed position of the annular sealing lips 46 and 48 is illustrated in phantom lines in FIG. 2. The installed position of the lips 46 and 48 is illustrated in full lines in FIG. 2 as the sealing lips 46 and 48 respectively engage the piston rods 16 and end wall 18.

The lips 46 and 48 each have inner ends joined integrally to the end wall 38. The sealing lips 46 and 48 each project from their inner ends at the end wall 38 to outer free ends 50 and 52, respectively, which are radially spaced from each other as illustrated in the drawings.

The rod engaging lip 46 has an inner side surface 54 for engaging the piston rod 16. As illustrated in the drawing, the inner side surface extends axially and radially inwardly (i.e., toward the axis of rod 16) approximately from the junction between the end wall 38 and the inner side wall 42. The sealing lip 46 has an outer side surface 56 extending between the end thereof. The inner end of the outer side surface 56 has its inner end located at the end wall 38 at a location spaced radially outwardly of the inner side wall 42 and radially inwardly of the outer side wall 44.

The cylinder engaging lip 48 has an outer side surface 58 extending between the ends thereof. The inner end of the outer side surface 58 is joined to the end wall 38 at a location spaced radially outwardly from the lip 46 and radially inwardly from the outer side wall 44. The side surface 58 extends axially and radially outwardly (i.e., away from the axis of rod 16) from the end wall 38. This position is more pronounced in the unstressed condition as illustrated in the phantom line position. The lip 48 has an inner side surface 60 extending between the ends thereof with its inner end joined to the end wall 38 adjacent the inner end of the side surface 56 of lip 46.

The portion of the end wall 38 extending radially outwardly of lip 48 to the side wall 44, the end wall 40 and the side wall 44 of the main body portion 36 constitute groove engaging surfaces of the body 36 for retaining the sealing member 28 in the end wall 18.

A clearance a is illustrated between the side wall 32 of the groove and the outer side wall 44 of the sealing member 28. Similarly, a clearance b is provided between the surface of the rod 16 and the inner side wall 42 of the sealing member 28. A clearance c is indicated between the lower portion of the side surface 58 of the cylinder engaging lip 48 and the wall of the opening 26. By way of example only, clearances a and b may be on the order of 0.010-0.015 inches.

The sealing member 28 is installed by inserting the body portion 36 into the groove as illustrated in FIG. 2. When the piston rod is installed, the lips 46 and 48 are compressed toward each other. Sealing pressure is applied between the surface of opening 26 and the other side surface 58 of lip 48. Similarly, sealing pressure is applied between the surface of rod 16 and the inner side surface 54 of the sealing lip 46. As the rod reciprocates, the rod engaging lip 46 scrapes dust and other foreign material from the surface of the rod as the rod moves from an inward stroke into the chamber 20. The clearances a, b and c accommodate transverse movement of rod 16 to prevent overstressing and reduce fatigue on the lips 46 and 48.

The length of the cylinder engaging lip 48 is less than the rod engaging lip 46 in the illustrated embodiment. However, if, for example, opening 26 were of greater diameter, the length of the cylinder engaging lip 48 could be greater than illustrated, and possibly as great as that of lip 46, depending upon the size of opening 26.

The rod 16 will tend to move transversely as the bearings (not shown) supporting the rod wear through use. With prior art wiping seals, the resulting stresses on the seal tends to distort the seal and permit dirt to enter around the seal along the walls 26, 30, 32 and 34 into the cylinder. Furthermore, such transverse movement of the rod increases the friction between the rod and prior art seals, and the excessive friction causes premature failure of the prior art seals. The sealing lip 48, in the arrangement illustrated, provides substantially uniform sealing pressure on surface 26 regardless of transverse movement of the rod 16. Furthermore, the ability of the seal 28 to shift transversely because of the clearances a, b and c prevents the occurrence of excessive pressure between the sealing lip 46 and the surface of rod 16.

While a specific form of the invention is described in the foregoing specification and illustrated in the accompanying drawings, it should be understood that the invention is not limited to the exact construction shown. Variations and alterations in the construction and arrangement of parts, all falling within the scope and spirit of the invention will be apparent to those skilled in the art.

The embodiments of the present invention in which an exclusive property or privilege is claimed are defined as follows:

1. A one-piece self-supporting rod wiping seal member of flexible elastomeric material that can be snap fitted into a retention groove comprising: an endless body portion having a mounting section for mounting the seal member in a supporting groove by flexibly distorting the body portion and snap fitting the mounting section in the supporting groove; and a sealing section extending radially from said mounting section, said body portion having a pair of spaced end walls each extending over both of said mounting and sealing sections and inner and outer side walls extending therebetween; said inner side wall being located on said sealing section and said outer side wall being located on said mounting section; first and second endless lips projecting from one of said end walls at said sealing section; each of said lips having an inner end joined integrally to said one end wall and projecting therefrom to an outer free end with the respective free ends spaced radially from each other; said first lip constituting a rod engaging lip and having an inner side surface extending between the inner and outer ends thereof and projecting from the junction between said inner side and said one end wall axially and radially inwardly in the unstressed condition of said first lip; said first lip having an outer side surface extending between the ends thereof with its inner end located at said one end wall at a location spaced radially outwardly of said inner side wall and radially inwardly of said outer side wall; said second lip consituting a cylinder engaging lip and having an outer side surface extending between the ends thereof with its inner end joined to said one end wall at a location spaced radially outwardly from said first lip and radially inwardly from said outer side wall, said outer side surface of said second lip projecting axially and radially outwardly from said one end wall in the unstressed condition of said second lip; said second lip having an inner side surface extending between the ends thereof with its inner end joined to said one end wall at a location spaced radially inwardly from said outer side surface thereof; said mounting section extending radially outwardly of said second lip with the portion of said one end wall in said mounting section, said outer side wall, and said other end wall constituting mounting groove engaging surfaces of said body for supporting said body in a mounting groove.

2. A seal member as claimed in claim 1 wherein the length of said first lip is greater than the length of said second lip.

3. A seal member as claimed in claim 1 wherein the inner ends of said outer side surface and inner side surface of said first and second lips, respectively, are joined to said one end wall at the same location such that said last named surfaces diverge from said end wall with respect to each other.

4. A piston and cylinder assembly comprising: a cylinder having an end wall with an axial opening formed therein; a piston having a rod reciprocably received in the opening in said end wall; a wiping seal retention groove formed in said end wall having a top wall, a bottom wall, and an annular side wall extending therebetween; a one-piece self supporting sealing member having a main body portion of substantially rectangular cross section received in said groove; said main body portion having top and bottom end walls in opposed relationship with the top and bottom end walls, respectively, of said groove; said main body portion having inner and outer annular side walls with said outer annular side wall in opposed relationship with the side wall of said groove; first and second endless lips projecting from said top end wall into the axial opening formed in the end wall of said cylinder; each of said lips having an inner end joined integrally to said top end wall and projecting therefrom to an outer free end with the respective free ends spaced radially from each other; said first lip constituting a rod engaging lip and having an inner side surface engaging the surface of said rod and projecting from said top end wall axially and radially inwardly in the unstressed condition thereof so as to apply sealing pressure to the surface of said piston rod; said second lip constituting a cylinder engaging lip and having an outer side surface extending between the ends thereof; said outer side surface of said second lip having an inner end joined to said top end wall at a location spaced radially inwardly from said outer annular side wall of said body, said outer side surface projecting axially and radially outwardly from said top end wall in the unstressed condition thereof so as to apply sealing pressure to the wall of said opening in said end wall of said cylinder; said sealing lips being resiliently flexed inwardly toward each other when said rod is inserted in the opening in said end wall to cause said sealing lips to apply sealing pressure to the surfaces of the rod and opening; the portion of said one end wall extending radially outwardly of said second lip, said outer side wall, and said other end wall constituting mounting groove engaging surfaces of said body received in said groove to support said body in said cylinder; a clearance being defined between the respective outer side wall of said main body portion and groove as well as a clearance being defined between said inner side wall of said main body portion and said rod to accommodate transverse movement of said rod when said sealing member is installed in said cylinder.

* * * * *